No. 869,672.　　　　　　　　　　　　　　　　PATENTED OCT. 29, 1907.
S. V. WEEKS.
REVERSIBLE DISK PLOW.
APPLICATION FILED JUNE 30, 1906.
4 SHEETS—SHEET 4.
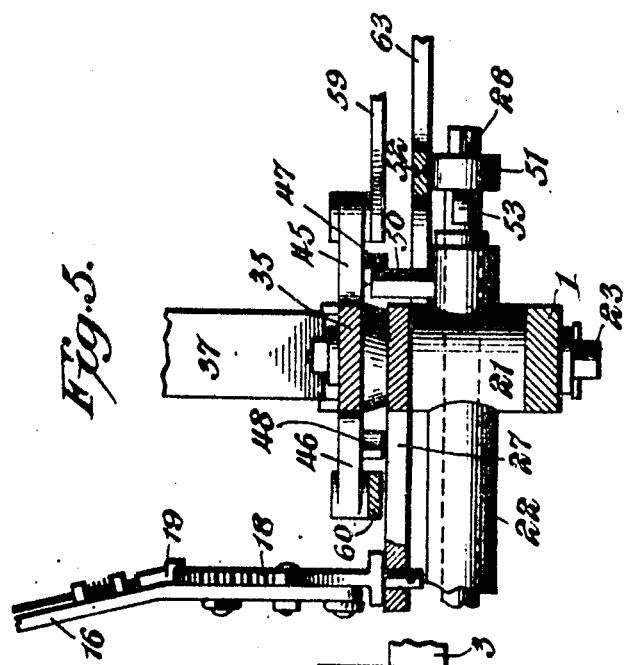
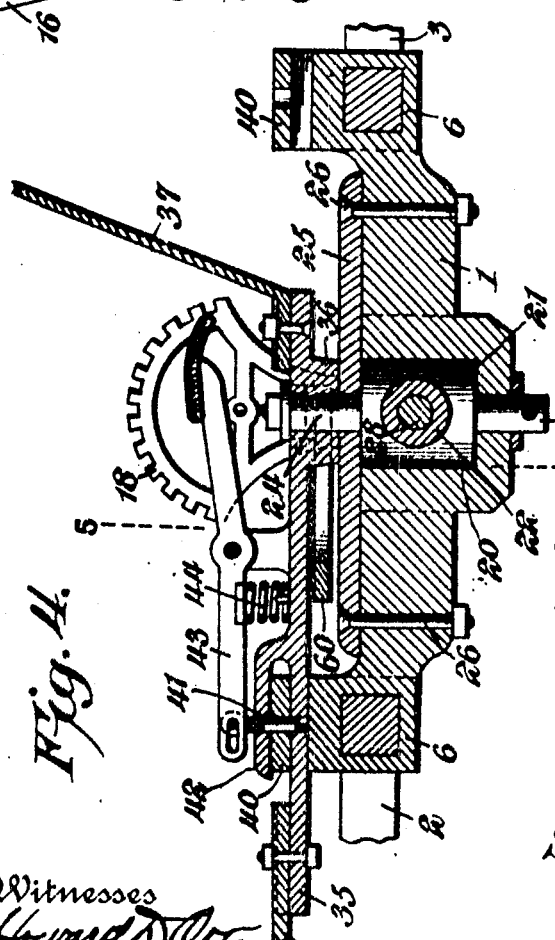
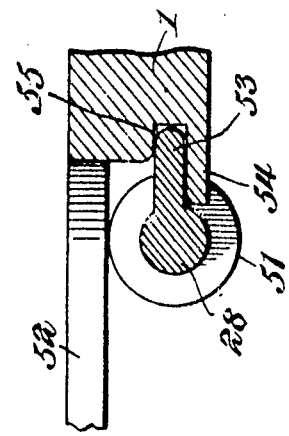
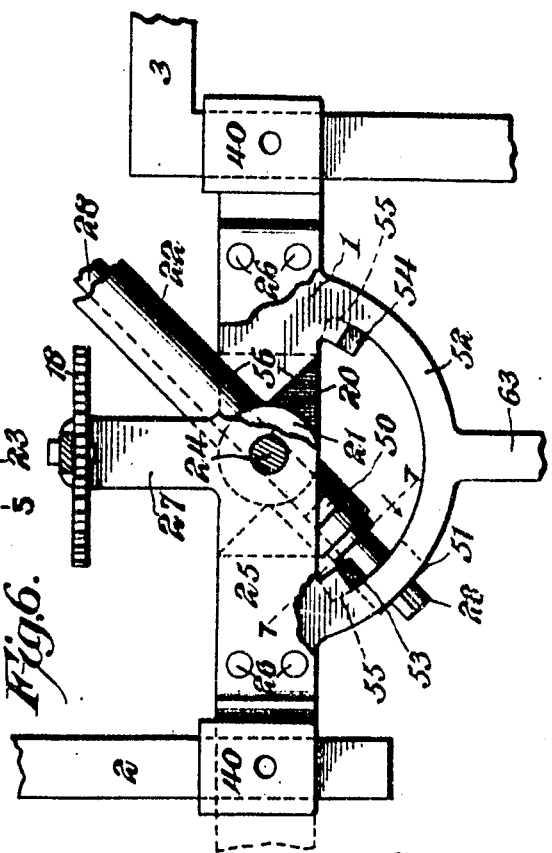
Witnesses　　　　　　　Samuel V. Weeks, Inventor,
　　　　　　　　　　　　By E. G. Siggers
　　　　　　　　　　　　　　Attorney

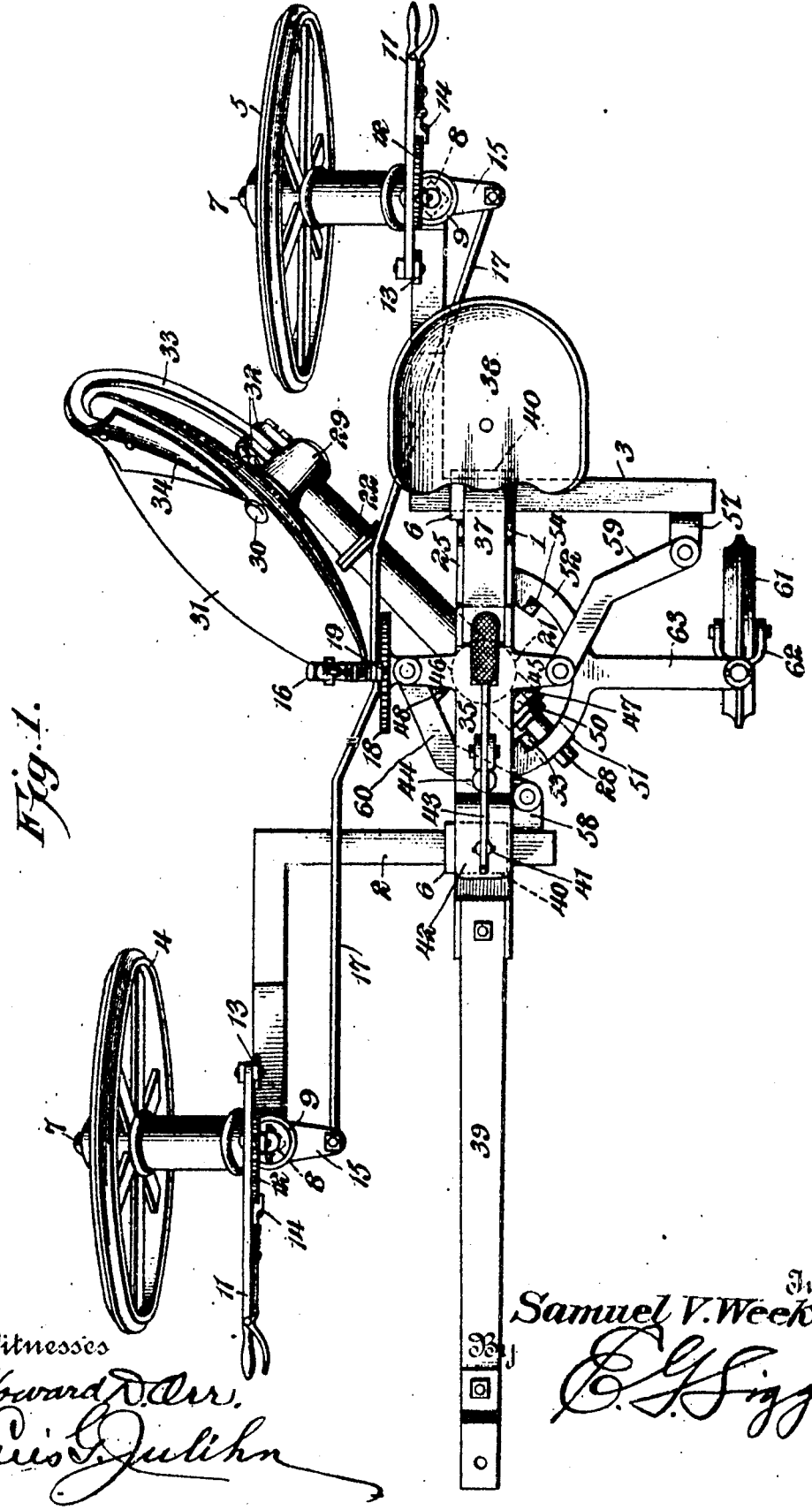

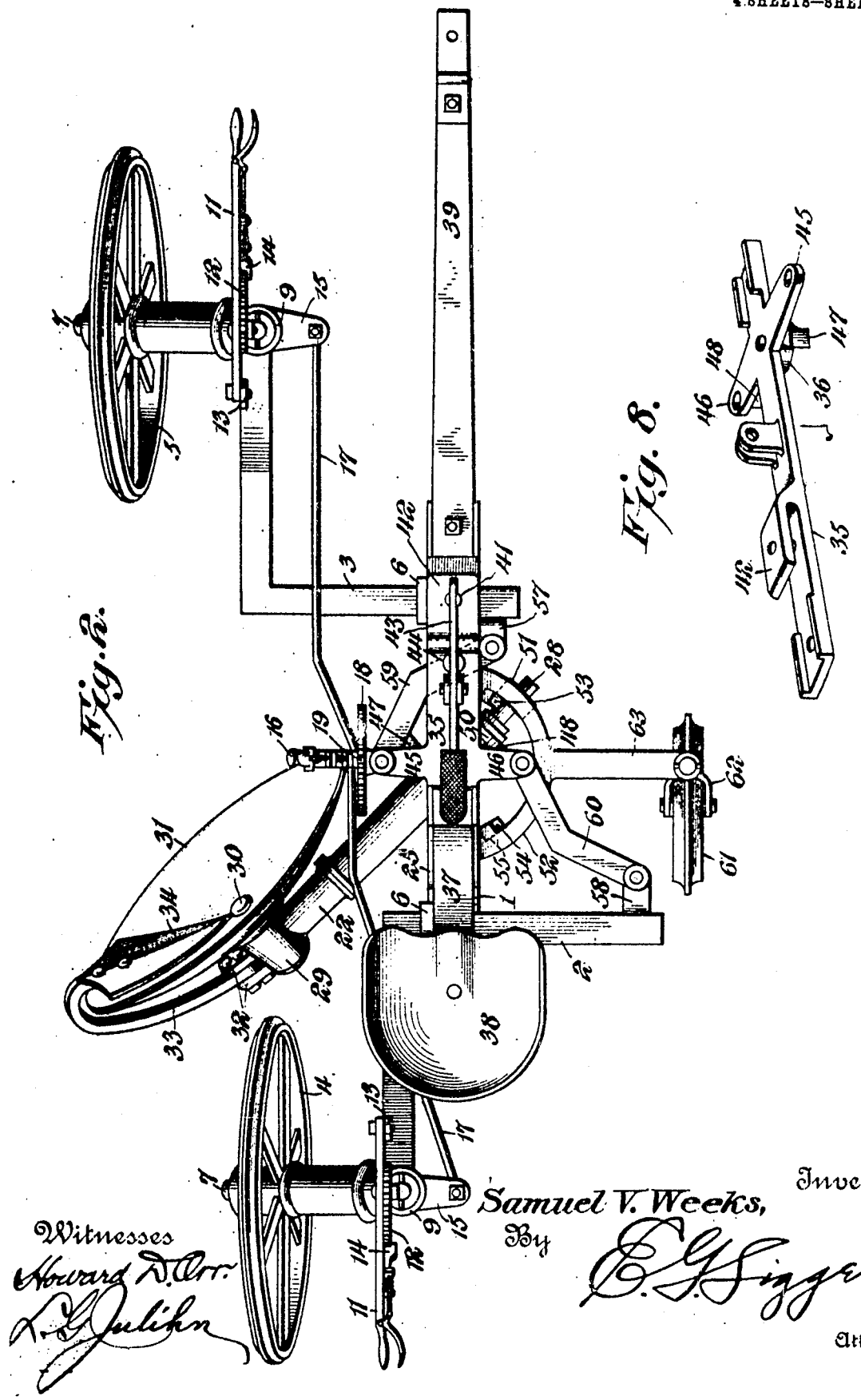

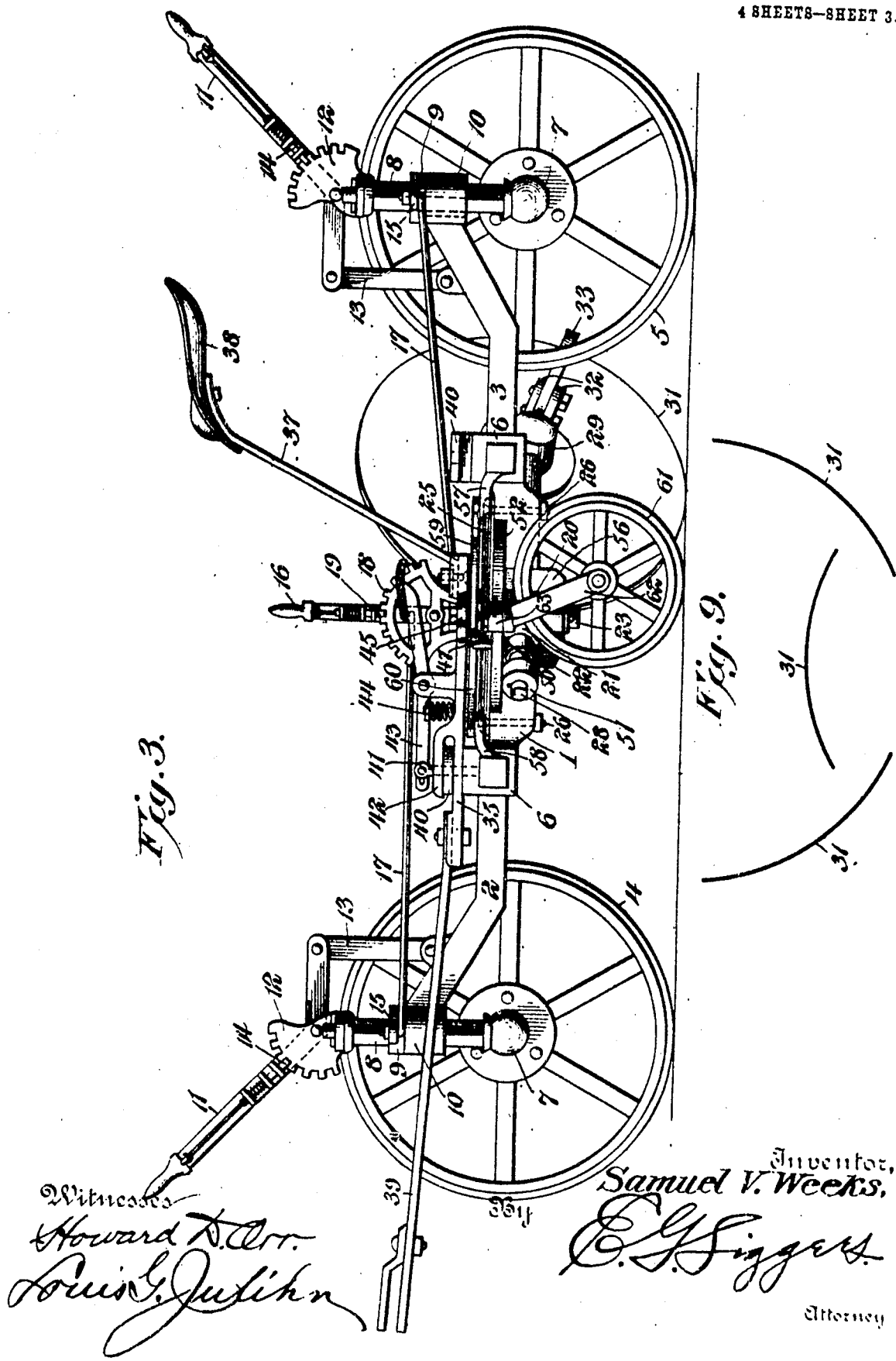

UNITED STATES PATENT OFFICE.

SAMUEL V. WEEKS, OF HIGHLAND PARK, TENNESSEE, ASSIGNOR TO THE VOLUNTEER DISC PLOW CO., OF CHATTANOOGA, TENNESSEE.

REVERSIBLE-DISK PLOW.

No. 869,672.

Specification of Letters Patent.

Patented Oct. 29, 1907.

Application filed June 30, 1906. Serial No. 324,200.

*To all whom it may concern:*

Be it known that I, SAMUEL V. WEEKS, a citizen of the United States, residing at Highland Park, in the county of Hamilton and State of Tennessee, have invented a new and useful Reversible-Disk Plow, of which the following is a specification.

My present invention relates to a reversible plow of that type which embodies a wheeled frame carrying furrow opening means, as for instance, a disk, reversible thereon to facilitate plowing back and forth on one side only of the land without turning the plow. In plows of this type the disk is ordinarily mounted on a standard which is oscillated to swing the disk horizontally to opposite angular positions with respect to the line of draft. This character of reversal is open to the objection that the disk is turned while in the ground, unless the entire plow frame is first elevated and the disk then reversed after being lifted out of the soil. Furthermore, it is impossible, except by the elevation of the entire plow frame, to lift the disk out of the ground for the purpose of clearing an obstruction which may be located in the line of the furrow, and if the obstruction projects materially above the surface of the ground, even this cumbersome method of causing its clearance by the disk is impossible, because the elevation of the plow frame is insufficient in extent for this purpose. Another objection to this type of plow is that in order to maintain the same relation between the furrow wheels and the disk, in both positions of the latter, said disk must be mounted midway between the wheels as it would otherwise be located nearer the front furrow wheel while plowing in one direction and the rear furrow wheel when plowing in the opposite direction, whereas the natural position of the disk is immediately in advance of the rear furrow wheel regardless of the direction in which the plow is moving.

Having in mind these commonly acknowledged inefficiencies of an otherwise highly efficient type of plow, one object of my invention is to produce a plow equipped with a disk so mounted that its reversal will cause the withdrawal of the disk from the ground and its re-presentation to the ground in reverse position, as distinguished from the twisting or turning of the disk in the ground in the ordinary manner.

Another object is to so mount the disk that the latter will be shifted in the act of reversal from a position adjacent to one furrow wheel to a similar position adjacent to the other furrow wheel, so that, instead of being located as usual at the same intermediate point between the wheels at all times, the disk, whether moving in one direction or the other, will be located immediately in advance of the rear furrow wheel.

Another object of the invention is to reverse the disk on a horizontal axis in such a manner that the disk will be withdrawn edgewise from the ground while the disk is being turned with its concave side moving toward the ground so that the disk will be withdrawn from the ground without scraping up the latter as would be the case if the disk was swung in the opposite direction.

A further object of the invention is to provide means, operated by the draft appliance, for automatically reversing the disk on a horizontal axis when the position of the draft appliance with respect to the plow is changed at the end of the furrow.

A further object of the invention is to provide automatic means whereby the disk will be locked in each of its positions, and a still further object of the invention is to provide means operated by the draft appliance to shift the furrow wheels laterally in opposite directions, whereby the front furrow wheel will be located in the line of the last furrow, while the rear furrow wheel will be located in the line of the new furrow, each of the wheels serving alternately as a front and a rear furrow wheel.

Several other objects subordinate to those stated will appear as the succeeding description of the illustrated embodiment of the invention is developed.

In the accompanying drawings—Figure 1 is a plan view of my plow when in position for movement to the left. Fig. 2 is a similar view of the plow when in position for movement in the reverse direction or to the right. Fig. 3 is a side elevation of the plow viewed from the unplowed land. Fig. 4 is an enlarged longitudinal section through the main frame and the immediately associated parts. Fig. 5 is a transverse section on the line 5—5 of Fig. 4. Fig. 6 is an enlarged plan view of the main frame and a portion of the reversing shaft and sleeve, certain of the parts being broken away to facilitate illustration. Fig. 7 is a detail section on the line 7—7 of Fig. 6. Fig. 8 is a detail view of the reversing bar, and Fig. 9 is a diagrammatic view illustrating the reversal of the disk.

Each part is indicated by the same numeral in the several views.

The frame structure of the plow includes a center casting or main frame 1, and two wheel frames 2 and 3 of angular form, as shown in Fig. 1, supported at their outer ends by furrow wheels 4 and 5. The inner ends of the wheel frames 2 and 3 are disposed transverse to the plow and are slidably received within guide boxes 6 at the opposite ends of the main frame 1 and preferably integral therewith. Those portions of the wheel frames which are received within the guide boxes are of square or other angular form in cross section in order to prevent relative movement of said frames with respect to the main frame, except in a direction transverse to the plow.

To provide for the vertical adjustment of the frame structure relative to the wheels, and to provide further for the shifting of the furrow wheels to enable the plow to be guided, the wheels are mounted on crank axles 7, as shown in Figs. 1 and 3. Each of these axles includes a standard 8 which is angular in cross section and is passed through a sleeve 9 rotatable in a vertically disposed bearing 10 at the outer end of one of the wheel frames. Each sleeve 9 and the wheel frame in which it is mounted, is designed to slide vertically upon the adjacent standard 8 as the frame structure is raised or lowered by the manipulation of the frame adjusting levers 11. Each of the levers 11 is fulcrumed intermediate of its ends upon a toothed segment 12 and is connected at its inner end by a link 13 to the adjacent wheel frame. The segment 12 is swiveled at the upper end of the standard 8 and is designed to be retained by a latch 14 carried by the lever. It will thus be seen that the levers may be released from the segments and adjusted to raise or lower the frame structure of the plow and then re-secured by the coöperation of the latches and segments to maintain the plow frame at the elevation to which it has been adjusted.

In order to permit the crank axles to be swung for the purpose of shifting the furrow wheels in the manner necessary to steer the plow, particularly when transporting the latter from one point of use to another, the sleeves 9 are provided with arms 15 connected to a steering lever 16, at opposite sides of the fulcrum of the latter, by steering rods 17. The steering lever 16 is fulcrumed on a toothed segment 18, swiveled upon its support in a manner to be hereafter described, to accommodate the different angular positions assumed by the steering rod 17 and coöperating with a latch 19 on the lever 16. By the manipulation of the lever 16, the crank axles at the opposite ends of the plow, normally retained in parallel relation for straight away plowing, may be moved in opposite directions for the purpose of causing the furrow wheels to assume opposite angular positions to enable the plow to be steered around a corner, either to the right or left, in plowing around four sides of a field, or in transporting the plow from one field to another.

The manner of mounting the disk will be best understood by a consideration of Figs. 4 to 7. Midway of the ends of the central casting or main frame 1, the latter is provided with a socket 20 in which is mounted the hub 21 of the disk reversing sleeve 22, the upper edge of the hub being flush with the upper surface of the central portion of the frame. The hub 21 is rotatable on a vertical axis to shift the sleeve 22 which extends in opposite directions from the hub, see Figs. 1 and 6, the hub being provided with vertically disposed trunnions 23 and 24, one of which is journaled in the bottom wall of the socket 20 and the other of which passes through and is journaled in the cap-plate 25 retained upon the upper surface of the frame 1, as for instance, by bolts 26. Since this cap-plate 25 has now been located, attention may be directed to the fact that the support upon which the segment 18 is swiveled, as heretofore stated, is an arm 27 extended laterally from the cap-plate 25, as shown in Fig. 6.

Rotatable in the sleeve 22 and extended beyond the ends thereof, is what may be termed the disk reversing shaft 28 provided adjacent to one end, to-wit, the end which projects toward the plowed land, with a journal box 29 for the reception of the spindle 30 of the furrow opener or disk 31. The reversing shaft 28 occupies at all times a substantially horizontal position, but is disposed normally at an angle to the line of draft, since the disk, whose axis is at right angles to the shaft, must be disposed at such an angle. The axis of the journal box 29 is not normally disposed horizontally, but is inclined sufficiently to provide for the required backward tilt of the disk. At the extremity of the reversing shaft, beyond the box 29, are located a pair of ears 32 between which is retained the end of the curved shank 33 of a scraper 34 retained by the shank in operative proximity to the front face of the disk 31. It will now be understood that by swinging the reversing sleeve 22 from the trunnions 23 and 24 as an axis, the disk may be shifted from its angular position adjacent to one end of the plow, as shown in Fig. 1, to an opposite angular position adjacent to the opposite end of the plow, as shown in Fig. 2. It will be equally obvious that by rotating the reversing shaft 28, the disk may be reversed upon a horizontal axis intersecting the axis of the disk so that the latter will not only be shifted to an opposite angular position adjacent to the opposite end of the plow, but will also be caused to face in the opposite direction.

Journaled on the upper trunnion 24 of the hub 21 is a reversing bar 35 spaced from the cap-plate 25 by a boss 36. At one end of this bar is secured the spring 37 of the driver's seat 38, and to the opposite end of the bar is secured, by suitable means, a draw-bar or other suitable draft appliance 39 by means of which the draft animals are hitched to the plow. At the opposite ends of the main frame 1 said frame is provided with apertured keeper flanges 40 located above the guide boxes, and in each of its reversed positions, the reversing bar 35 is located under one of these flanges and in line with the frame 1, see Figs. 1 and 2. To retain the reversing bar in either position, the latter is equipped with a locking pin 41 which passes through coincident apertures in the reversing bar and the adjacent keeper flange and also through an apertured lug 42 integral with the bar 35 and overlying the keeper flange, as shown in Fig. 4. The upper end of the locking pin 41 has a slot and pin connection with one end of a foot lever 43, urged in one direction by a spring 44 and designed to be swung in the opposite direction by the foot of the operator to withdraw the pin 41 from its locking position. When the reversing bar is unlocked or released, it may be swung around, as for instance, from the position indicated in Fig. 1 to that indicated in Fig. 2, when the plow reaches one end of the furrow and the draft animals are driven around to the opposite end of the plow, preparatory to drawing the same back across the field.

The act of reversing the position of the reversing bar 35 automatically effects the shifting of the disk from one end of the plow to the other and also the reversal of the disk upon a horizontal axis, as heretofore explained. To accomplish these results, the reversing bar 35 is provided with a pair of laterally extending arms 45 and 46 disposed radially, as shown in Fig. 1, with respect to the axis of the bar. The arms 45 and 46 are provided with pendent lugs 47 and 48 whose active faces are disposed radially to the axis of the arm and, approximately at right angles to each other. The lugs 47 and 48 are designed to alternately engage a lug 50 extended upwardly from the reversing sleeve 22 at the end thereof opposite the disk. Thus in Fig. 1, the lug 47 on the reversing bar is shown in contact with the lug 50 on the reversing sleeve, while the lug 48 is shown removed from the lug 50 by a considerable interval. If now, the reversing bar is swung around, the lug 47 will recede from the lug 50, while the lug 48 will approach the lug 50 and finally contact therewith, after the reversing bar has made a quarter turn. During the subsequent movement of the reversing bar, the engagement effected between it and the sleeve by the engagement of the lugs will cause said sleeve to be swung from the position shown in Fig. 1 to that shown in Fig. 2, for the purpose of shifting the disk from its angular position adjacent to the wheel 5 to an opposite angular position adjacent to the wheel 4, which latter, having served as the front wheel of the plow, will now become the rear wheel, as the plow is drawn back across the field in the opposite direction. This swinging of the reversing sleeve to transport the disk is also utilized to rotate the disk reversing shaft 28 for the purpose of withdrawing the disk from the ground and re-presenting the latter to the ground in reversed position. To accomplish this, the shaft 28 is provided upon its extremity with a gear wheel 51 contacting with the under side of the segmental track 52 extending from and preferably formed integral with the central casting or main frame 1, see Figs. 5 and 6. As the reversing shaft 28 swings laterally with the reversing sleeve 6 which is swung around by the reversing bar in the manner described, the engagement between the friction wheel and the under side of the track 52 will cause the reversing shaft to rotate, thus reversing the disk so that, by the time said disk has been shifted, from one location to the other, it will also be reversed and will be presented to the ground in reversed position. For the purpose of accurately limiting the movement of the reversing shaft, in order to insure the accurate reversal of the disk, said shaft is provided adjacent to the friction wheel or pinion 51 with a combined stop and locking lug 53 which, when the reversing shaft has rotated sufficiently, will contact with a stop flange 54 projecting from the main frame 1, as shown in Figs. 6 and 7. This engagement of the flange and lug takes place a short time before the swinging movement of the reversing sleeve and shaft is completed. Therefore, while the rotary movement of the shaft will be arrested, the latter will, nevertheless, continue to move laterally with the pinion 51 sliding along the track 52 until the end of the lug 53 finally engages the horizontal recess 55 at the inner end of the flange 54. The engagement of the lug 53 with the walls of the recess 55 will positively lock the reversing shaft against rotation so as to preclude the possibility of accidental reversal of the disk by any strain sustained thereby. It will, of course, be understood that the flange 54 and the recess 55 are duplicated at each end of the track 52, see Fig. 6, so that the reversing shaft is arrested and locked at each limit of its movement.

In order to rigidly hold the reversing sleeve 22 in each of its opposite angular positions, the opposite walls of the socket 20 are of angular form, as shown in Fig. 6, to provide angularly related abutments 56 against which the sleeve is held firmly by the engagement of one of the lugs 47 or 48 with the lug 50. It will be noted, however, by reference to Figs. 1 and 6, in which the parts appear in corresponding positions, that the strain imposed upon the sleeve while plowing is resisted by the solid abutments of the main frame and not by the lugs. At this point attention is particularly directed to the fact that in reversing the disk, the latter is turned in a direction which will present the concave side of the disk opposite the ground when the disk reaches an intermediate position, as shown diagrammatically in Fig. 9. The turning of the disk in this direction enables it to be withdrawn from the ground with the utmost freedom, instead of being impeded by the soil, as would be the case if the reversing shaft were turned in the opposite direction, which would obviously cause the lower edge of the concave side of the disk to be raised against the resistance of the soil in a manner similar to the lifting of a shovelful of dirt. Furthermore, the freedom with which the disk is reversed is greatly facilitated by reason of the fact that the reversing shaft is moving laterally while the disk is being reversed, since it will be seen that the former movement serves to tilt the disk forwardly, while its lower edge is being elevated, so that the lower edge of the disk, instead of being dragged back through the ground, is lifted out of the ground without material resistance.

Another prominent feature of novelty resides in the automatic shifting of the furrow wheels 4 and 5 in a lateral direction with respect to the plow. In plows of this type the front furrow wheel should be located in the line of the last furrow turned, while the rear furrow wheel should be located in the line of the new furrow, see Fig. 1. Thus the rear furrow wheel should be located in a new furrow and immediately in rear of the disk, while the front furrow wheel should be a considerable distance in advance of the disk and offset laterally from the plow frame a sufficient distance to present it in the furrow last made. If this relation of the wheels and disk is established it will be seen that when the plow is reversed, the wheels will not occupy their proper positions. I have therefore provided means whereby the turning of the reversing bar by the draft animals will not only move the disk to the opposite end of the plow and reverse the same, but will also effect relative shifting of the plow frame and furrow wheels so that the latter will occupy the proper relation to the disk and frame when the plow is traveling in the reverse direction.

We have already seen that the inner parallel ends of the front and rear wheel frames 2 and 3 are disposed transversely of the plow and are slidably received within the guide boxes 6. It will now be seen, by reference to Fig. 1, that the frames 2 and 3 are provided at their inner ends with ears 57 and 58 connected respectively to the outer ends of the arms 45 and 46 by bent links 59 and 60. These links are located in the plane of the space between the cap-plate 25 and the reversing bar 35, see Fig. 4, so that when the reversing bar is turned to one position or the other, the links may pass freely between these elements of the structure. (Compare Figs. 1 and 2.) It will thus be seen that when the plow reaches the end of a furrow and the draft animals are driven from one end of the plow to the other, the main frame and the wheel frames will be caused to slide relatively so that the furrow wheel which has been located immediately in rear of the disk will now assume a position more remote from the plow frame, while the other furrow wheel will be drawn in toward the frame. In other words, the rear furrow wheel will be thrown out to the front furrow wheel position, while the wheel which has served as a front furrow wheel will be drawn into the rear furrow wheel position. It will of course be understood that this movement of the wheel frames may be merely relative to the main frame, since, as a matter of fact, the reversal of the plow, organized as shown in Fig. 1, may effect the lateral shifting of the main frame on the wheel frame 3 and the shifting of the wheel frame 2 both with the main frame and relative thereto, so that the wheel 5 will remain in the furrow just made while the wheel 4 will occupy a plane intermediate of the main frame and the wheel 5 to dispose it in the line of the furrow to be made, as the plow is now drawn back across the field in the opposite direction with the parts organized as shown in Fig. 2. The land side wheel 61 is mounted in a bracket 62 swiveled at the outer end of an arm 63 extending laterally from the main frame of the plow and preferably, though not necessarily, formed integral with the track 52.

In certain of the claims, I have employed the term "double ended plow", which term is intended to define a plow of that type which is movable back and forth across a field without turning, either end of the plow frame occupying an advanced position, according to the direction in which the plow is moved.

In certain broad aspects, the construction illustrated herein involves the invention described and claimed in the co-pending application of Charles M.
Mallory and James M. Slaughter, Serial Number 319,318, but it is to be understood that I make no claim to any structure disclosed in the said Mallory and Slaughter application.

It is thought that the construction and operation of the plow will be clearly understood from the foregoing description, but it is obvious that many structural changes, modifications, or variations may be effected without departing from the spirit of the invention, and I therefore reserve the right to change or modify the illustrated construction within the scope of the protection prayed.

What I claim is:—

1. A reversible plow including a disk operative in reversed positions and reversible in a direction to present its concave side opposite the ground when the disk is in its intermediate position.

2. A reversible plow including a disk operative in reversed positions and reversible on a substantially horizontal axis and in a direction to present its concave side opposite the ground when the disk is in its intermediate position.

3. A reversible plow including a disk operative in reversed positions and reversible on a substantially horizontal axis disposed transverse to the plow and in a direction to present its concave side opposite the ground when the disk is in its intermediate position.

4. A reversible plow including a disk reversible on a substantially horizontal axis and movable under said axis during such reversal.

5. A plow including a support, and a disk carried thereby and reversible on a shiftable axis to different operative positions in which the disk faces the opposite ends of the plow.

6. A plow including a frame structure, a disk support mounted to swing therefrom, and a disk carried by said support and movable endwise of the plow and also movable to either side of the support.

7. A plow including a supporting structure, a furrow opening disk, and an approximately horizontal disk support rotatable on an approximately horizontal axis and arranged to swing from an approximately vertical axis.

8. A plow including a frame structure, a horizontal rotary disk support mounted to swing therefrom and rotatable on its longitudinal axis, a disk carried by said support, and means for swinging said support to shift the disk to different positions endwise of the frame.

9. A plow including a support, a disk carried thereby and reversible on a horizontal axis which is laterally shiftable endwise of the plow during the act of reverse.

10. A plow including a support, a disk carried thereby and reversible on a substantially horizontal axis disposed transverse to the plow, and means operative to reverse the disk and to shift the axis of reversal laterally.

11. A plow including a reversible disk, shiftable endwise of the plow and mechanism for moving the disk from both horizontal and vertical axes to reverse and shift said disk.

12. A plow including a disk, and mechanism for shifting the disk bodily around a vertical axis and for reversing the disk upon a horizontal axis.

13. A plow including a disk, and mechanism for shifting the disk from two angularly related axes at the same time.

14. A plow including a disk, mechanism for shifting the disk from two angularly related axes at the same time to reverse the disk and to shift the same to a different position, and means for locking the disk. 1( 15. A plow including a frame structure, furrow wheels, a disk intermediate of the wheels, and means for shifting the disk from a position adjacent to one furrow wheel to a position adjacent to the other furrow wheel and for moving the disk in another direction to reverse the same.

16. A plow including a frame structure, a reversible disk shiftable endwise of the plow, disk shifting means, disk reversing means, and disk locking means.

17. In a plow, the combination with a frame, of a rotary disk reversing shaft laterally movable independently of the frame, and a disk carried by the shaft.

18. A plow including a frame structure, a laterally movable rotary reversing shaft, a disk carried by the shaft, and mechanism for rotating the shaft to reverse the disk and for moving the shaft laterally to shift the disk from one point to another.

19. A plow including a frame structure, a rotary reversing shaft movable to opposite angular positions relative to the frame structure, and a disk carried by the shaft and reversible by the rotation thereof. 12

20. A plow including a frame structure, a disk, a bodily movable reversing shaft for the disk, and means whereby the bodily movement of said shaft will cause the rotation thereof, to reverse the disk.

21. A plow including a disk, a laterally movable reversing shaft therefor, and means whereby the lateral movement of the reversing shaft will cause the same to rotate for the purpose of effecting the reversal of the disk.

22. A plow including a disk, a laterally movable reversing shaft therefor, and means whereby the lateral movement of the shaft will cause the same to rotate, said means including a relatively fixed part and gearing intermediate of said fixed part and the reversing shaft.

23. A plow including a disk and a horizontally disposed, rotary, disk reversing shaft mounted to swing from a vertical axis.

24. A plow including a frame structure, a disk, a horizontally disposed, rotary, disk reversing shaft mounted on the frame to swing from a vertical axis, a pinion carried by the shaft, and a relatively fixed track engaged by the pinion to cause the reversing shaft to rotate when swung.

25. A plow including a disk, a rotary disk reversing shaft movable laterally, means for causing the shaft to rotate during the movement thereof, and means for locking said shaft at the completion of its movement.

26. A plow including a disk, a laterally movable, rotary, disk reversing shaft, means for causing the shaft to rotate during its lateral movement, and means whereby the lateral movement of the shaft will cause the locking of the shaft against further rotary movement after predetermined rotary movement thereof.

27. A plow including a disk, a rotary and laterally movable disk-reversing shaft, means for causing the lateral movement of the shaft to effect the rotation thereof, and means for arresting the rotary movement of the shaft, said means including a lug movable with the shaft and a relatively fixed lug coöperating therewith.

28. A plow including a disk, a rotary and laterally movable disk reversing shaft, and means for arresting both the rotary and lateral movement of the shaft and for locking said shaft, said means including elements brought into coöperative relation by the movement of the shaft.

29. A double ended disk plow including a supporting structure, a sleeve movable thereon, a furrow opening disk reversible to face toward either end of the plow, and a shaft rotatable in the sleeve to reverse the disk.

30. A double ended plow including a supporting structure, a laterally movable sleeve thereon, a furrow opening disk reversible to face toward either end of the plow, and a shaft carrying the disk and rotatable in the sleeve to reverse said disk.

31. A double ended plow including furrow and land wheels, a supporting structure, a sleeve mounted to swing therefrom, a disk movable to face toward either end of the plow, and a shaft carrying the disk and rotatable in the sleeve to reverse said disk and thus position the same for plowing in either direction.

32. A double ended plow including furrow and land wheels, a supporting structure, a sleeve carried thereby, a disk, and a shaft mounted in the sleeve, said sleeve and shaft being laterally movable and one of said elements being rotatable to reverse the disk and thus cause the same to face toward either end of the plow.

33. A plow including a frame structure, a sleeve mounted to swing thereon, a disk reversing shaft mounted in the sleeve, a disk carried by the shaft, means for swinging the sleeve, and means for rotating the shaft.

34. A plow including a frame, a sleeve carried by the frame and mounted to swing from a vertical axis located intermediate of its ends, a disk reversing shaft mounted to rotate in the sleeve and extended beyond the opposite ends thereof, a disk carried by one end of the shaft, and means coöperating with the opposite end of the shaft to rotate the same.

35. A plow including a frame, a sleeve carried by the frame and mounted to swing from a vertical axis located intermediate of its ends, a disk reversing shaft rotatable in the sleeve and extended beyond the opposite ends thereof, a disk mounted at one end of the reversing shaft, means for swinging the sleeve, and gearing coöperating with the opposite end of the reversing shaft to rotate said shaft as the sleeve is swung.

36. A plow including a frame structure, a sleeve carried thereby and mounted to swing from a vertical axis, a disk reversing shaft rotatable in the sleeve and extended beyond the opposite ends thereof, a disk mounted at one end of the shaft, a pinion carried at the opposite end of the shaft, a track coöperating with the pinion to rotate the shaft when the sleeve is swung, and coöperating stop members associated with the shaft and track respectively to limit the rotary movement of the shaft.

37. A plow including a frame structure, a sleeve carried thereby and mounted to swing from a vertical axis, a disk reversing shaft rotatable in the sleeve and extended beyond the opposite ends thereof, a disk mounted at one end of the shaft, a pinion carried at the opposite end of the shaft, a track coöperating with the pinion to rotate the shaft when the sleeve is swung, coöperating stop members associated with the shaft and track respectively to limit the rotary movement of the shaft, and means coöperating with one of said stop members to lock the shaft against reverse rotation.

38. A plow including a disk operative in reversed positions and reversible on a substantially horizontal axis and a draft appliance coöperatively related to the disk to reverse the same.

39. A reversible plow including a disk operative in reversed positions and reversible on a substantially horizontal axis disposed transverse to the line of draft, and a draft appliance movable to effect the reversal of the disk.

40. A reversible plow including a disk operative in reversed positions and reversible on a substantially horizontal axis, and a reversing bar movable on a substantially vertical axis and arranged to effect the reversal of the disk.

41. A plow including a frame, furrow wheels, a land wheel, a disk located between the furrow wheels and reversible on a substantially horizontal axis, and a draft appliance movable to reverse the disk.

42. A plow including a disk operative in reversed positions and reversible on a substantially horizontal axis and in a direction to present the concave side of the disk opposite the ground when the disk is in an intermediate position, and a draft appliance movable to reverse the disk.

43. A plow including a disk operative in reversed positions and reversible on a substantially horizontal axis and in a direction to present the concave side of the disk opposite the ground when the disk is in an intermediate position, and a reversing bar rotatable on a substantially vertical axis to reverse the disk.

44. A plow including a disk reversible on a substantially horizontal axis disposed transverse to the plow, a draft appliance shiftable from one end of the plow to the other, and means operated by the draft appliance to reverse the disk.

45. A plow including a disk movable to reversed positions and shiftable in a different direction to a different position longitudinally of the plow, and a draft appliance movable to shift the disk and to reverse said disk during the shifting thereof.

46. A plow including a frame structure and furrow wheels, a reversible disk shiftable by a movement other than its reversing movement to a position adjacent to either furrow wheel, and a draft appliance movable to shift said disk to either of said positions.

47. A plow including a frame structure, furrow wheels, a land wheel, a reversible disk shiftable to a position adjacent to either furrow wheel, a draft appliance shiftable to either end of the plow, and means operated by the draft appliance to reverse the disk by a movement thereof other than the shifting movement of the disk.

48. A plow including a frame structure, furrow wheels, and a land wheel, a reversible disk shiftable to a position adjacent to either furrow wheel by a movement other than the reversing movement of the disk, a draft appliance shiftable to either end of the plow, and means operated by the draft appliance to shift and reverse the disk.

49. A plow including a frame structure, furrow wheels, a land wheel, a reversible disk shiftable to a position adjacent to either furrow wheel, and a reversing bar rotatable on a substantially vertical axis to shift and reverse the disk by imparting simultaneous movement thereto in different directions.

50. A plow including a frame structure, a laterally movable reversing shaft carried thereby, a draft appliance arranged to shift the shaft laterally, and means for causing the shaft to rotate.

51. A plow including a frame structure, furrow wheels, and a land wheel, a horizontal reversing shaft disposed transverse to the frame structure and mounted to swing from a vertical axis, a disk carried by the reversing shaft, a draft appliance reversible on the frame structure, means operated by the draft appliance to swing the reversing shaft for the purpose of shifting the disk from a position adjacent to one furrow wheel to a position adjacent to the other furrow wheel, and means operating during the swinging of the reversing shaft to rotate said shaft for the purpose of reversing the disk.

52. A plow including a frame structure, a sleeve mounted to swing thereon, a draft appliance arranged to swing the sleeve, a reversing shaft rotatable in the sleeve, and a disk carried by the shaft.

53. A plow including a frame structure, a laterally movable sleeve, a shaft interfitting therewith, one of said elements being rotary, a disk carried by the rotary element and having its axis disposed in angular relation thereto, and a draft appliance arranged to move the shaft and sleeve laterally.

54. A plow including a frame structure, a sleeve mounted to swing therefrom, a shaft rotatable in the sleeve, a disk carried in the shaft, a draft appliance reversible on the frame and arranged to swing the sleeve, and gearing for rotating the shaft as the sleeve is swung.

55. A plow including a main frame, furrow wheel frames supporting the main frame, swinging crank axles supporting the wheel frames, furrow wheels supporting the axles, and means for effecting relative shifting of the several frames to adjust the relative positions of the main frame and furrow wheels.

56. A plow including a main frame disposed in the general direction of the line of draft a pair of wheel frames connected for movement in opposite directions transverse to the frame and supporting the latter, and furrow wheels both located at the same side of the plow and supporting the respective wheel frames.

57. A plow including a main frame, furrow wheels supporting the front and rear ends thereof, and means for effecting relative shifting of the frame and furrow wheels to present either of said wheels nearer the line of the frame than the other wheel.

58. A plow including a frame structure, furrow wheel frames shiftable transversely thereof, crank axles mounted to swing from the wheel frames, furrow wheels supporting the crank axles, and means for shifting the main frame relatively to one wheel frame and for shifting the other wheel frame relatively to the main frame, to move the main frame away from one furrow wheel and to present the other furrow wheel nearer the main frame.

59. A plow including a main frame, furrow wheel frames slidably connected to the front and rear ends of the main frame, and means connecting said wheel frames to compel the same to move in opposite directions relative to the main frame.

60. A plow including a main frame, a pair of furrow wheel frames, disposed transverse to the main frame, means for moving the furrow wheel frames in opposite directions relative to the main frame and furrow wheels located at the same side of the main frame and supporting the wheel frames.

61. A plow including a main frame, furrow wheel frames relatively adjustable transversely thereof and located at the front and rear ends of the main frame, and means carried by the main frame for effecting relative adjustment of the wheel frames.

62. A plow including a main frame, transversely adjustable furrow wheel frames connected thereto, and a draft appliance movable to effect relative adjustment of the main frame and furrow wheel frames.

63. A reversible plow including a main frame, furrow wheel frames adjustable transversely thereof but in opposite directions, a draft appliance reversible on the main frame, and means connecting the draft appliance with each of the furrow wheel frames.

64. A plow including a main frame, a disk, and furrow wheels, a draft appliance movable to reverse the disk on a substantially horizontal axis and to shift the positions of the furrow wheels with respect to the frame.

65. A plow including a frame, shiftable furrow wheels, a reversible disk shiftable to a position adjacent to either furrow wheel by a movement other than the reversing movement of the disk, and a draft appliance movable to shift and reverse the disk and to shift the positions of the furrow wheels.

66. A plow including a frame, furrow wheels, a disk shiftable to a position adjacent to either furrow wheel, means operative to shift the disk and to shift the frame away from one furrow wheel and to shift the other furrow wheel toward the frame.

67. A plow including a frame, furrow wheels, a reversible disk shiftable to a position adjacent to either furrow wheel, and means for shifting and reversing the disk and for shifting the frame and one furrow wheel to different positions relative to the other furrow wheel.

68. A plow including a frame, furrow wheels, a disk reversible on a substantially horizontal axis and shiftable to a position adjacent to either furrow wheel, and means operative to shift and reverse the disk and to shift the furrow wheels with respect to the frame.

69. A plow including a main frame, extending in the general direction of the line of draft, furrow wheel frames shiftable transversely of the main frame, a shiftable disk, and means operative to shift the disk and also operative to effect relative shifting of the main frame and wheel frames.

70. A plow including a main frame, furrow wheel frames adjustable laterally thereof, crank axles mounted to swing in the wheel frames, furrow wheels supporting said axles, means for swinging said axles, and means for effecting relative shifting of the several frames.

71. A plow including a main frame, a land wheel, furrow wheels, crank axles constituting mountings for the furrow wheels, means for swinging the crank axles simultaneously but in opposite directions, furrow wheel frames having shiftable connection with the main frame and supported by the crank axles, and means for effecting relative shifting of the main frame and wheel frames.

72. A plow including a main frame, furrow wheel frames, means for effecting relative adjustment of the main frame and wheel frames, crank axles at the outer ends of the wheel frames, furrow wheels supporting the crank axles, and means carried by the main frame for swinging the crank axles simultaneously but in opposite directions.

73. A plow including a main frame, furrow wheel frames shiftable transversely thereof, a reversing bar provided with laterally extending arms, and links connecting said arms to the wheel frames.

74. A plow including a support, a disk operative in reversed positions and movable out of the ground in the act of reversal, and a draft appliance movable to reverse the disk.

75. In a plow, the combination with a support, of a reversible disk movable relative to the support, said movement including, as components thereof, the reversing movement of the disk and a movement serving in conjunction with the reversing movement to move the disk a greater distance than the reversing movement alone.

In testimony, that I claim the foregoing as my own, I have hereto affixed my signature in the presence of two witnesses.

SAMUEL V. WEEKS.

Witnesses:
ANDREW M. CAROTHERS.
CHAS. O. DECKER.